(12) United States Patent
Meagher et al.

(10) Patent No.: US 7,573,809 B2
(45) Date of Patent: Aug. 11, 2009

(54) SEMI-TRANSPARENT TIME DIVISION MULTIPLEXER/DEMULTIPLEXER

(75) Inventors: Kevin S. Meagher, Bowie, MD (US); James Westdorp, Perry Hall, MD (US); Michael Vaughn, Duluth, GA (US)

(73) Assignee: CIENA Corporation, Linthicum, MD (US)

( * ) Notice: Subject to any disclaimer, the term of this patent is extended or adjusted under 35 U.S.C. 154(b) by 777 days.

(21) Appl. No.: 11/016,840

(22) Filed: Dec. 21, 2004

(65) Prior Publication Data
US 2005/0141569 A1 Jun. 30, 2005

Related U.S. Application Data

(62) Division of application No. 09/552,109, filed on Apr. 19, 2000, now Pat. No. 6,870,860.

(51) Int. Cl.
*H04J 3/14* (2006.01)
*H04J 3/04* (2006.01)

(52) U.S. Cl. ........................ 370/216; 370/535
(58) Field of Classification Search ................. None
See application file for complete search history.

(56) References Cited

U.S. PATENT DOCUMENTS

| | | | |
|---|---|---|---|
| 4,698,806 A | 10/1987 | Graves et al. | |
| 4,719,624 A | 1/1988 | Bellisio | |
| 4,987,570 A | 1/1991 | Almond et al. | |
| 5,210,745 A | 5/1993 | Guinand et al. | |
| 5,257,261 A | 10/1993 | Parruck et al. | |
| 5,278,689 A | 1/1994 | Gitlin et al. | |
| 5,291,485 A * | 3/1994 | Afify et al. | 370/476 |
| 5,331,641 A * | 7/1994 | Parruck et al. | 370/506 |
| 5,535,218 A * | 7/1996 | Ng et al. | 370/506 |
| 5,539,914 A | 7/1996 | Fry et al. | |
| 5,579,323 A | 11/1996 | Krisher | |
| 5,617,233 A | 4/1997 | Boncek | |
| 5,666,351 A | 9/1997 | Oksanen et al. | |
| 5,841,760 A | 11/1998 | Martin et al. | |
| 5,857,092 A | 1/1999 | Nakamura et al. | |
| 6,011,802 A | 1/2000 | Norman | |
| 6,298,038 B1 * | 10/2001 | Martin et al. | 370/216 |
| 6,487,686 B1 * | 11/2002 | Yamazaki et al. | 714/703 |
| 6,542,478 B1 | 4/2003 | Park | |

(Continued)

*Primary Examiner*—Ricky Ngo
*Assistant Examiner*—Clemence Han
(74) *Attorney, Agent, or Firm*—Clements Bernard PLLC; Christopher L. Bernard; Tyler S. Brown

(57) ABSTRACT

A semi-transparent time division multiplexer/demultiplexer that transmits low rate tributaries from one location to another using a high rate aggregate connection, while preserving substantially all of the TOH and payload for each tributary signal. Transparency of the tributary TOH is accomplished by interleaving both the TOH and the Payload of each tributary into the high rate aggregate signal. Some TOH bytes may be tunneled or re-mapped into unused/undefined TOH locations in the aggregate signal to allow transparency of the TOH without corrupting the aggregate. Errors may be handled by tunneling BIP bytes into unused/undefined aggregate locations and updating the tunneled bytes with error masks calculated at each network elements. Alternatively errors may be forwarded by using an error mask generated from the tributary BIP locations and inserting the mask into the associated aggregate BIP locations. The mask in the aggregate BIP is updated with error masks calculated at each network elements.

20 Claims, 14 Drawing Sheets

U.S. PATENT DOCUMENTS 6,608,844 B1 8/2003 Teodorescu et al.
6,636,519 B1 10/2003 Walsh et al.

2002/0159473 A1* 10/2002 Roberts et al. .............. 370/442

* cited by examiner

COLUMN 1 — 40

| STS(1-48) | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| CHANNEL | 0 | 1 | 2 | 3 | 0 | 1 | 2 | 3 | 0 | 1 | 2 | 3 | 0 | 1 | 2 | 3 |
| STS ID | 0 | 0 | 0 | 0 | 1 | 1 | 1 | 1 | 2 | 2 | 2 | 2 | 3 | 3 | 3 | 3 |
| STS(0-47) | 0 | 1 | 2 | 3 | 4 | 5 | 6 | 7 | 8 | 9 | 10 | 11 | 12 | 13 | 14 | 15 |
| ROW 1 | A1 | A1 | A1 | A1 | A1 | A1 | A1 | A1 | A1 | A1 | A1 | A1 | A1 | A1 | A1 | A1 |
| ROW 2 | B1 | B1 | B1 | B1 | B1 | B1 | B1 | B1 | B1 | B1 | B1 | B1 | B1 | B1 | B1 | B1 |
| ROW 3 | D1 | D1 | D1 | D1 | D1 | D1 | D1 | D1 | D1 | D1 | D1 | D1 | D1 | D1 | D1 | D1 |
| ROW 4 | H1 | H1 | H1 | H1 | H1 | H1 | H1 | H1 | H1 | H1 | H1 | H1 | H1 | H1 | H1 | H1 |
| ROW 5 | B2 | B2 | B2 | B2 | B2 | B2 | B2 | B2 | B2 | B2 | B2 | B2 | B2 | B2 | B2 | B2 |
| ROW 6 | D4 | D4 | D4 | D4 | D4 | D4 | D4 | D4 | D4 | D4 | D4 | D4 | D4 | D4 | D4 | D4 |
| ROW 7 | D7 | D7 | D7 | D7 | D7 | D7 | D7 | D7 | D7 | D7 | D7 | D7 | D7 | D7 | D7 | D7 |
| ROW 8 | D10 | D10 | D10 | D10 | D10 | D10 | D10 | D10 | D10 | D10 | D10 | D10 | D10 | D10 | D10 | D10 |
| ROW 9 | S1 | S1 | S1 | S1 | S1 | S1 | S1 | S1 | S1 | S1 | S1 | S1 | S1 | S1 | S1 | S1 |

COLUMN 2 — 42

| STS(1-48) | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| CHANNEL | 0 | 1 | 2 | 3 | 0 | 1 | 2 | 3 | 0 | 1 | 2 | 3 | 0 | 1 | 2 | 3 |
| STS ID | 0 | 0 | 0 | 0 | 1 | 1 | 1 | 1 | 2 | 2 | 2 | 2 | 3 | 3 | 3 | 3 |
| STS(0-47) | 0 | 1 | 2 | 3 | 4 | 5 | 6 | 7 | 8 | 9 | 10 | 11 | 12 | 13 | 14 | 15 |
| ROW 1 | A2 | A2 | A2 | A2 | A2 | A2 | A2 | A2 | A2 | A2 | A2 | A2 | A2 | A2 | A2 | A2 |
| ROW 2 | E1 | E1 | E1 | E1 | E1 | E1 | E1 | E1 | E1 | E1 | E1 | E1 | E1 | E1 | E1 | E1 |
| ROW 3 | D2 | D2 | D2 | D2 | D2 | D2 | D2 | D2 | D2 | D2 | D2 | D2 | D2 | D2 | D2 | D2 |
| ROW 4 | H2 | H2 | H2 | H2 | H2 | H2 | H2 | H2 | H2 | H2 | H2 | H2 | H2 | H2 | H2 | H2 |
| ROW 5 | K1 | K1 | K1 | K1 | K1 | K1 | K1 | K1 | K1 | K1 | K1 | K1 | K1 | K1 | K1 | K1 |
| ROW 6 | D5 | D5 | D5 | D5 | D5 | D5 | D5 | D5 | D5 | D5 | D5 | D5 | D5 | D5 | D5 | D5 |
| ROW 7 | D8 | D8 | D8 | D8 | D8 | D8 | D8 | D8 | D8 | D8 | D8 | D8 | D8 | D8 | D8 | D8 |
| ROW 8 | D11 | D11 | D11 | D11 | D11 | D11 | D11 | D11 | D11 | D11 | D11 | D11 | D11 | D11 | D11 | D11 |
| ROW 9 | M0 | M0 | M0 | M0 | M0 | M0 | M0 | M0 | M0 | M0 | M0 | M0 | M0 | M0 | M0 | M0 |

COLUMN 3 — 44

| STS(1-48) | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| CHANNEL | 0 | 1 | 2 | 3 | 0 | 1 | 2 | 3 | 0 | 1 | 2 | 3 | 0 | 1 | 2 | 3 |
| STS ID | 0 | 0 | 0 | 0 | 1 | 1 | 1 | 1 | 2 | 2 | 2 | 2 | 3 | 3 | 3 | 3 |
| STS(0-47) | 0 | 1 | 2 | 3 | 4 | 5 | 6 | 7 | 8 | 9 | 10 | 11 | 12 | 13 | 14 | 15 |
| ROW 1 | J0 | J0 | J0 | J0 | J0 | J0 | J0 | J0 | J0 | J0 | J0 | J0 | J0 | J0 | J0 | J0 |
| ROW 2 | F1 | F1 | F1 | F1 | F1 | F1 | F1 | F1 | F1 | F1 | F1 | F1 | F1 | F1 | F1 | F1 |
| ROW 3 | D3 | D3 | D3 | D3 | D3 | D3 | D3 | D3 | D3 | D3 | D3 | D3 | D3 | D3 | D3 | D3 |
| ROW 4 | H3 | H3 | H3 | H3 | H3 | H3 | H3 | H3 | H3 | H3 | H3 | H3 | H3 | H3 | H3 | H3 |
| ROW 5 | K2 | K2 | K2 | K2 | K2 | K2 | K2 | K2 | K2 | K2 | K2 | K2 | K2 | K2 | K2 | K2 |
| ROW 6 | D6 | D6 | D6 | D6 | D6 | D6 | D6 | D6 | D6 | D6 | D6 | D6 | D6 | D6 | D6 | D6 |
| ROW 7 | D9 | D9 | D9 | D9 | D9 | D9 | D9 | D9 | D9 | D9 | D9 | D9 | D9 | D9 | D9 | D9 |
| ROW 8 | D12 | D12 | D12 | D12 | D12 | D12 | D12 | D12 | D12 | D12 | D12 | D12 | D12 | D12 | D12 | D12 |
| ROW 9 | E2 | E2 | E2 | E2 | E2 | E2 | E2 | E2 | E2 | E2 | E2 | E2 | E2 | E2 | E2 | E2 |

| 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|
| 0 | 1 | 2 | 3 | 0 | 1 | 2 | 3 | 0 | 1 | 2 | 3 | 0 | 1 | 2 | 3 |
| 4 | 4 | 4 | 4 | 5 | 5 | 5 | 5 | 6 | 6 | 6 | 6 | 7 | 7 | 7 | 7 |
| 16 | 17 | 18 | 19 | 20 | 21 | 22 | 23 | 24 | 25 | 26 | 27 | 28 | 29 | 30 | 31 |
| A1 | A1 | A1 | A1 | A1 | A1 | A1 | A1 | A1 | A1 | A1 | A1 | A1 | A1 | A1 | A1 |
| MDB | MDB | MDB | MDB | MDB | MDB | MDB | MDB | MDB | MDB | MDB | MDB | MDB | MDB | MDB | MDB |
| MDB | MDB | MDB | MDB | MDB | MDB | MDB | MDB | MDB | MDB | MDB | MDB | MDB | MDB | MDB | MDB |
| H1 | H1 | H1 | H1 | H1 | H1 | H1 | H1 | H1 | H1 | H1 | H1 | H1 | H1 | H1 | H1 |
| B2 | B2 | B2 | B2 | B2 | B2 | B2 | B2 | B2 | B2 | B2 | B2 | B2 | B2 | B2 | B2 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| Z1 | Z1 | Z1 | Z1 | Z1 | Z1 | Z1 | Z1 | Z1 | Z1 | Z1 | Z1 | Z1 | Z1 | Z1 | Z1 |

64

| 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|
| 0 | 1 | 2 | 3 | 0 | 1 | 2 | 3 | 0 | 1 | 2 | 3 | 0 | 1 | 2 | 3 |
| 4 | 4 | 4 | 4 | 5 | 5 | 5 | 5 | 6 | 6 | 6 | 6 | 7 | 7 | 7 | 7 |
| 16 | 17 | 18 | 19 | 20 | 21 | 22 | 23 | 24 | 25 | 26 | 27 | 28 | 29 | 30 | 31 |
| A2 | A2 | A2 | A2 | A2 | A2 | A2 | A2 | A2 | A2 | A2 | A2 | A2 | A2 | A2 | A2 |
| MDB | MDB | MDB | MDB | MDB | MDB | MDB | MDB | MDB | MDB | MDB | MDB | MDB | MDB | MDB | MDB |
| MDB | MDB | MDB | MDB | MDB | MDB | MDB | MDB | MDB | MDB | MDB | MDB | MDB | MDB | MDB | MDB |
| H2 | H2 | H2 | H2 | H2 | H2 | H2 | H2 | H2 | H2 | H2 | H2 | H2 | H2 | H2 | H2 |
| b2 | b2 | b2 | b2 | b2 | b2 | b2 | b2 | b2 | b2 | b2 | b2 | b2 | b2 | b2 | b2 |
| j0 | 0 | 0 | 0 | j0 | 0 | 0 | 0 | j0 | 0 | 0 | 0 | j0 | 0 | 0 | 0 |
| b1 | 0 | 0 | 0 | b1 | 0 | 0 | 0 | b1 | 0 | 0 | 0 | b1 | 0 | 0 | 0 |
| alt | 0 | 0 | 0 | alt | 0 | 0 | 0 | alt | 0 | 0 | 0 | alt | 0 | 0 | 0 |
| Z2 | Z2 | Z2 | Z2 | Z2 | Z2 | Z2 | Z2 | Z2 | Z2 | Z2 | Z2 | Z2 | Z2 | Z2 | Z2 |

100 (pointing to b2 row)

66

| 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|
| 0 | 1 | 2 | 3 | 0 | 1 | 2 | 3 | 0 | 1 | 2 | 3 | 0 | 1 | 2 | 3 |
| 4 | 4 | 4 | 4 | 5 | 5 | 5 | 5 | 6 | 6 | 6 | 6 | 7 | 7 | 7 | 7 |
| 16 | 17 | 18 | 19 | 20 | 21 | 22 | 23 | 24 | 25 | 26 | 27 | 28 | 29 | 30 | 31 |
| Z0/X | Z0/X | Z0/X | Z0/X | Z0/X | Z0/X | Z0/X | Z0/X | Z0/X | Z0/X | Z0/X | Z0/X | Z0/X | Z0/X | Z0/X | Z0/X |
| X | X | X | X | X | X | X | X | X | X | X | X | X | X | X | X |
| j0 | j0 | j0 | j0 | j0 | j0 | j0 | j0 | j0 | j0 | j0 | j0 | j0 | j0 | j0 | j0 |
| H3 | H3 | H3 | H3 | H3 | H3 | H3 | H3 | H3 | H3 | H3 | H3 | H3 | H3 | H3 | H3 |
| k1 | k1 | k1 | k1 | k1 | k1 | k1 | k1 | k1 | k1 | k1 | k1 | k1 | k1 | k1 | k1 |
| k1 | 0 | 0 | 0 | k1 | 0 | 0 | 0 | k1 | 0 | 0 | 0 | k1 | 0 | 0 | 0 |
| k2 | 0 | 0 | 0 | k2 | 0 | 0 | 0 | k2 | 0 | 0 | 0 | k2 | 0 | 0 | 0 |
| m1 | 0 | 0 | 0 | m1 | 0 | 0 | 0 | m1 | 0 | 0 | 0 | m1 | 0 | 0 | 0 |
| m1/X | m1/X | m1/X | m1/X | m1/X | m1/X | m1/X | m1/X | m1/X | m1/X | m1/X | m1/X | m1/X | m1/X | m1/X | m1/X |

COLUMN 1

| STS(1-12) | 1 | 2 | 3 | 4 | 5 | 6 | 7 | 8 | 9 | 10 | 11 | 12 |
|---|---|---|---|---|---|---|---|---|---|---|---|---|
| CHANNEL | 0 | 0 | 0 | 0 | 0 | 0 | 0 | 0 | 0 | 0 | 0 | 0 |
| STS ID | 0 | 1 | 2 | 3 | 4 | 5 | 6 | 7 | 8 | 9 | 10 | 11 |
| STS(0-11) | 0 | 1 | 2 | 3 | 4 | 5 | 6 | 7 | 8 | 9 | 10 | 11 |
| ROW 1 | A1 | A1 | A1 | A1 | A1 | A1 | A1 | A1 | A1 | A1 | A1 | A1 |
| ROW 2 | B1 | B1 | B1 | B1 | MDB | MDB | MDB | MDB | MDB | MDB | MDB | MDB |
| ROW 3 | D1 | D1 | D1 | D1 | MDB | MDB | MDB | MDB | MDB | MDB | MDB | MDB |
| ROW 4 | H1 | H1 | H1 | H1 | H1 | H1 | H1 | H1 | H1 | H1 | H1 | H1 |
| ROW 5 | B2 | B2 | B2 | B2 | B2 | B2 | B2 | B2 | B2 | B2 | B2 | B2 |
| ROW 6 | D4 | D4 | D4 | D4 | 0 | 0 | 0 | 0 | 0 | 0 | 0 | 0 |
| ROW 7 | D7 | D7 | D7 | D7 | 0 | 0 | 0 | 0 | 0 | 0 | 0 | 0 |
| ROW 8 | D10 | D10 | D10 | D10 | 0 | 0 | 0 | 0 | 0 | 0 | 0 | 0 |
| ROW 9 | S1 | S1 | S1 | S1 | Z1 | Z1 | Z1 | Z1 | Z1 | Z1 | Z1 | Z1 |

COLUMN 2

| STS(1-12) | 1 | 2 | 3 | 4 | 5 | 6 | 7 | 8 | 9 | 10 | 11 | 12 |
|---|---|---|---|---|---|---|---|---|---|---|---|---|
| CHANNEL | 0 | 0 | 0 | 0 | 0 | 0 | 0 | 0 | 0 | 0 | 0 | 0 |
| STS ID | 0 | 1 | 2 | 3 | 4 | 5 | 6 | 7 | 8 | 9 | 10 | 11 |
| STS(0-11) | 0 | 1 | 2 | 3 | 4 | 5 | 6 | 7 | 8 | 9 | 10 | 11 |
| ROW 1 | A2 | A2 | A2 | A2 | A2 | A2 | A2 | A2 | A2 | A2 | A2 | A2 |
| ROW 2 | E1 | E1 | E1 | E1 | MDB | MDB | MDB | MDB | alt | alt | alt | alt |
| ROW 3 | D2 | D2 | D2 | D2 | MDB | MDB | MDB | MDB | b2 | b2 | b2 | b2 |
| ROW 4 | H2 | H2 | H2 | H2 | H2 | H2 | H2 | H2 | H2 | H2 | H2 | H2 |
| ROW 5 | K1 | K1 | K1 | K1 | b2 | b2 | b2 | b2 | b2 | b2 | b2 | b2 |
| ROW 6 | D5 | D5 | D5 | D5 | 0 | 0 | 0 | 0 | 0 | 0 | 0 | 0 |
| ROW 7 | D8 | D8 | D8 | D8 | b1 | 0 | 0 | 0 | 0 | 0 | 0 | 0 |
| ROW 8 | D11 | D11 | D11 | D11 | alt | 0 | 0 | 0 | 0 | 0 | 0 | 0 |
| ROW 9 | M0 | M0 | M0 | M0 | Z2 | Z2 | Z2 | Z2 | M1 | M1 | M1 | M1 |

COLUMN 3

| STS(1-12) | 1 | 2 | 3 | 4 | 5 | 6 | 7 | 8 | 9 | 10 | 11 | 12 |
|---|---|---|---|---|---|---|---|---|---|---|---|---|
| CHANNEL | 0 | 0 | 0 | 0 | 0 | 0 | 0 | 0 | 0 | 0 | 0 | 0 |
| STS ID | 0 | 1 | 2 | 3 | 4 | 5 | 6 | 7 | 8 | 9 | 10 | 11 |
| STS(0-11) | 0 | 1 | 2 | 3 | 4 | 5 | 6 | 7 | 8 | 9 | 10 | 11 |
| ROW 1 | J0 | J0 | J0 | J0 | Z0/X | Z0/X | Z0/X | Z0/X | Z0/X | Z0/X | Z0/X | Z0/X |
| ROW 2 | F1 | F1 | F1 | F1 | X | X | X | X | X | X | X | X |
| ROW 3 | D3 | D3 | D3 | D3 | j0 | j0 | j0 | j0 | b1 | b1 | b1 | b1 |
| ROW 4 | H3 | H3 | H3 | H3 | H3 | H3 | H3 | H3 | H3 | H3 | H3 | H3 |
| ROW 5 | K2 | K2 | K2 | K2 | k1 | k1 | k1 | k1 | k2 | k2 | k2 | k2 |
| ROW 6 | D6 | D6 | D6 | D6 | k1 | 0 | 0 | 0 | 0 | 0 | 0 | 0 |
| ROW 7 | D9 | D9 | D9 | D9 | k2 | 0 | 0 | 0 | 0 | 0 | 0 | 0 |
| ROW 8 | D12 | D12 | D12 | D12 | m1 | 0 | 0 | 0 | 0 | 0 | 0 | 0 |
| ROW 9 | E2 | E2 | E2 | E2 | m1/X | m1/X | m1/X | X | X | X | X | X |

FIG. 8

COLUMN 1 — 88, 40b

| | 1 | 2 | 3 |
|---|---|---|---|
| STS(1-3) | 1 | 2 | 3 |
| CHANNEL | 0 | 0 | 0 |
| STS ID | 0 | 1 | 2 |
| STS(0-2) | 0 | 1 | 2 |
| ROW 1 | A1 | A1 | A1 |
| ROW 2 | B1 | MDB | MDB |
| ROW 3 | D1 | MDB | MDB |
| ROW 4 | H1 | H1 | H1 |
| ROW 5 | B2 | B2 | B2 |
| ROW 6 | D4 | | |
| ROW 7 | D7 | | |
| ROW 8 | D10 | | |
| ROW 9 | S1 | Z1 | Z1 |

COLUMN 2 — 42b, 96, 118

| | 1 | 2 | 3 |
|---|---|---|---|
| STS(1-3) | 1 | 2 | 3 |
| CHANNEL | 0 | 0 | 0 |
| STS ID | 0 | 1 | 2 |
| STS(0-2) | 0 | 1 | 2 |
| ROW 1 | A2 | A2 | A2 |
| ROW 2 | E1 | MDB | a1 |
| ROW 3 | D2 | MDB | b2 |
| ROW 4 | H2 | H2 | H2 |
| ROW 5 | K1 | b2 | b2 |
| ROW 6 | D5 | | |
| ROW 7 | D8 | | |
| ROW 8 | D11 | | |
| ROW 9 | M0 | Z2 | M1 |

122  120

COLUMN 3 — 44b, 124, 90, 92, 94

| | 1 | 2 | 3 |
|---|---|---|---|
| STS(1-3) | 1 | 2 | 3 |
| CHANNEL | 0 | 0 | 0 |
| STS ID | 0 | 1 | 2 |
| STS(0-2) | 0 | 1 | 2 |
| ROW 1 | J0 | Z0/X | Z0/X |
| ROW 2 | F1 | X | X |
| ROW 3 | D3 | j0 | k1 |
| ROW 4 | H3 | H3 | H3 |
| ROW 5 | K2 | k1 | H4 |
| ROW 6 | D6 | | |
| ROW 7 | D9 | | |
| ROW 8 | D12 | | |
| ROW 9 | E2 | m1/X | X |

FIG.9

SEMI-TRANSPARENT TIME DIVISION MULTIPLEXER/DEMULTIPLEXER

This application is a Divisional of application Ser. No. 09/552,109, filed on Apr. 19, 2000 now U.S. Pat. No. 6,870,860, the entire contents of which are hereby incorporated by reference and for which priority is claimed under 35 U.S.C. § 120.

FIELD OF THE INVENTION

The present invention is directed to an optical multiplexer/demultiplexer for use in a dense wavelength division multiplexed optical system.

BACKGROUND OF THE INVENTION

Optical communication systems are a substantial and fast growing constituent of communication networks. The expression "optical communication system," as used herein, relates to any system that uses optical signals to convey information across an optical waveguiding medium, for example, an optical fiber. Such optical systems include but are not limited to telecommunication systems, cable television systems, and local area networks (LANs). Currently, the many optical communication systems are configured to carry an optical channel of a single wavelength over one or more optical waveguides. To convey information from plural sources, time-division multiplexing is frequently employed (TDM). In time-division multiplexing, a particular time slot is assigned to each signal source, the complete signal being constructed from the portions of the signals collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of existing fiber optic networks. WDM systems typically include a plurality of transmitters, each respectively transmitting signals on a designated one of a plurality of channels or wavelengths. In a simple point-to-point network, the channels are combined by a multiplexer at one end terminal and transmitted on a single fiber to a demultiplexer at another end terminal where they are separated and supplied to respective receivers. In more complex systems, an add/drop multiplexer may be present at each node for dropping one or more particular channels from the DWDM signal, and subsequently adding the one or more channels back to the signal prior to transmission to another network node.

Even in DWDM systems, however, fiber capacity is being exceed, resulting in congestion of the data carried on many networks. One way to relieve the congestion is to leverage technology advances to transmit data at higher rates. To accomplish this, all the equipment on a network could be upgraded to the higher data rate. This is, however, quite expensive and time consuming. A preferable method of relieving congestion would be to increase capacity on particular spans without requiring an upgrade of all network equipment, particularly on spans where congestion is not yet problematic. This approach requires a method of collecting lower data rate tributary channels and assembling the channels into a higher data rate aggregate signal.

To date, the prior art has failed to provide an effective, reliable, and cost-efficient multiplexer/demultiplexer for serving this purpose. A main difficulty in this regard relates to maintenance of the Payload and transport overhead (TOH) bytes in the tributary signals. Once the lower data rate tributary signals are combined into the aggregate according to a standard SONET/SDH method, the overhead bytes in the tributary signals are irretrievably lost. This seriously limits the ability to provide line maintenance signaling, section/line/path performance monitoring, and fault isolation for the tributary signals.

Thus, there is a need for a semi-transparent time division multiplexer/demultiplexer, which transmits low rate tributaries from one location to another using a high rate aggregate connection, while preserving the TOH and Payload for each tributary.

SUMMARY OF THE INVENTION

The present invention is therefore organized about the concept of providing a semi-transparent time division multiplexer/demultiplexer that transmits low rate tributaries from one location to another using a high rate aggregate connection, while preserving substantially all of the TOH and payload for each tributary signal. Transparency of the tributary TOH is accomplished by interleaving both the TOH and the Payload of each tributary into the high rate aggregate signal. Some TOH bytes may be tunneled or re-mapped into unused/undefined TOH locations in the aggregate signal to allow transparency of the TOH without corrupting the aggregate.

Errors may be handled by tunneling BIP bytes into unused/undefined aggregate locations and updating the tunneled bytes with error masks calculated at each network element. Alternatively, errors may be forwarded by using an error mask generated from the tributary BIP locations and inserting the mask into the associated aggregate BIP locations. The mask in the aggregate BIP is updated with error masks calculated at each network element.

Re-timing of TOH to a synchronized clock in the tributary framer circuits can be accomplished using controlled slips of overhead frames, whereby an entire frame is dropped or added depending on the relationship of the received clock and the synchronized clock. DCC bytes may be re-timed by adding or deleting flag bytes occurring between respective DCC packets. Re-timing of the aggregate TOH to a transmit clock may be accomplished in a similar manner.

In particular, a semi-transparent multiplexer/demultiplexer consistent with the invention includes a plurality of input ports, each of the input ports receives a respective one of a plurality of tributary input signals having a first data rate, each of the tributary input signals including a transport overhead (TOH) and a payload signal. Each input port is coupled to a respective tributary framer receive circuit. Each tributary framer receive circuit is configured for re-timing associated ones of the TOH and the payload signals to a synchronized data rate. An STS switch combines each of the re-timed payload signals and a portion of each of the re-timed TOH signals into an aggregate signal. An aggregate framer transmit circuit transmits the aggregate signal at a second data rate higher than the first data rate.

In one embodiment, at least one of the tributary framer receive circuits may include means for tunneling or re-mapping at least one byte of at least one of the TOH signals. The tunneled byte is combined into an unused TOH location of the aggregate signal. The tunneled bytes may include J0, K1, K2, and/or M1 bytes from the at least one TOH signal. The tunneled byte may also include a BIP byte, e.g. a B1, B2, or B3 byte, from the at least one TOH signal. To facilitate error reporting, for example, all B2 bytes of the tributaries may be tunneled to unused aggregate TOH locations.

Each tributary framer receive circuit may include a TOH processor for re-timing an associated one of the TOH signals and a separate payload processor for re-timing an associated one of the payload signals. The TOH processor may include a frame buffer for receiving respective frames of the TOH signals at an input clock rate derived from the first data rate and transmitting the frames of the associated one of the TOH signals at the synchronized clock rate. The frame buffer may be configured to delete a frame when the input clock rate is faster than the synchronized clock rate and the buffer is filling, and to copy a frame to the buffer when the input clock rate is slower than the synchronized clock rate and the buffer is emptying.

The TOH processor may also include a DCC buffer for receiving respective packets of DCC bytes of the associated one of the TOH signals at an input clock rate derived from the first data rate and transmitting the packets at the synchronized clock rate. The DCC buffer may be configured to delete flag bytes between the packets when the input clock rate is faster than the synchronized clock rate and the DCC buffer is filling, and to add flag bytes between the packets when the input clock rate is slower than the synchronized clock rate and the DCC buffer is emptying.

BRIEF DESCRIPTION OF THE DRAWINGS

Advantages of the present invention will be apparent from the following detailed description of the presently preferred embodiments thereof, which description should be considered in conjunction with the accompanying drawings in which:

FIG. 4 illustrates an OC-48 frame according to the SONET standard;

FIG. 5 illustrates an OC-12 frame according to the SONET standard;

FIGS. 7B-7D illustrate an exemplary OC-48 aggregate frame consistent with the invention and illustrate exemplary overhead tunneling locations consistent with the invention;

FIG. 8 illustrates an exemplary OC-12 aggregate frame consistent with the invention and illustrates exemplary overhead tunneling locations consistent with the invention;

FIG. 9 illustrates an exemplary OC-3 aggregate frame consistent with the invention and illustrates exemplary overhead tunneling locations consistent with the invention;

DETAILED DESCRIPTION

As is known, the SONET standards ANSI T1.105 and Bellcore GR-253-CORE, define a physical interface, optical line rates known as optical carrier (OC) signals, a frame format, and an operation, administration, maintenance, and provisioning (OAM&P) protocol. User signals are converted into a standard electrical format called the synchronous transport signal (STS), which is the equivalent of the optical signal to be transmitted on an optical network. The basic STS-1 frame consists of 90 columns by 9 rows of bytes and has a length of 125 microseconds, resulting in a rate of 51.840 Mb/s. Higher rates (STS-N, STS-Nc) are built from STS-1, and lower rates are subsets of STS-1. Advantageously, the SONET standard facilitates multiplexing of various STS-N input streams onto optical fiber channels.

Figure 1:
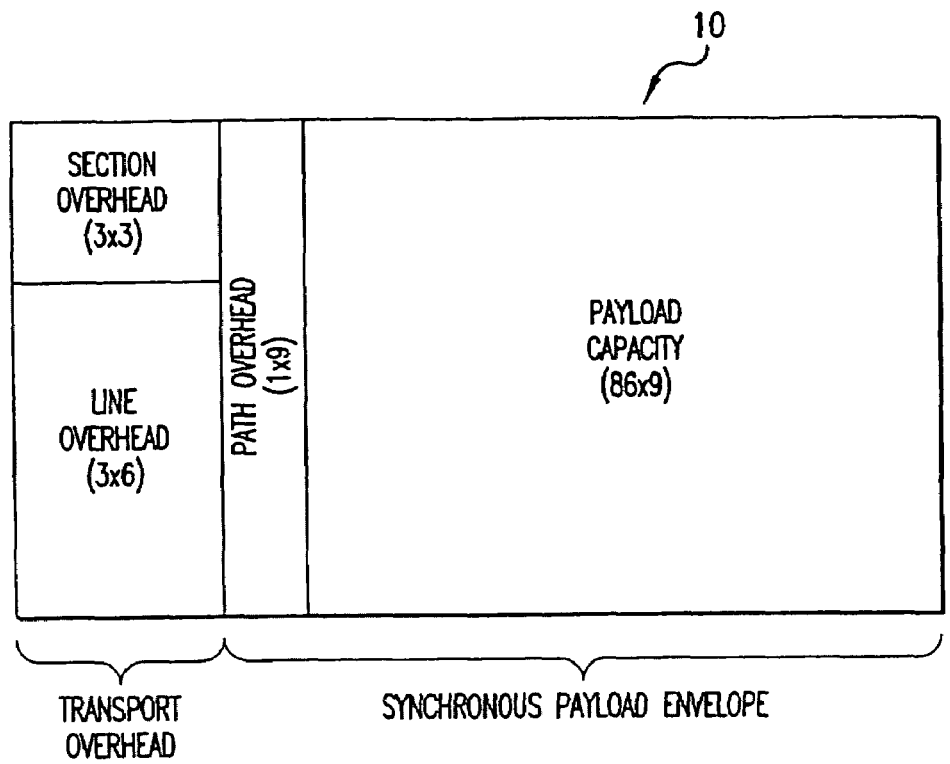
FIG. 1 is a diagram of overhead and payload allocation according to the SONET standard.

Turning to FIG. 1, there is illustrated the structure of a basic STS-1 frame 10. As shown, the frame comprises a transport overhead (TOH) consisting of three columns and 9 rows, and a synchronous payload envelope (SPE) comprising 87 columns, one column for the path overhead (POH) and 86 columns for the payload. The TOH includes a section overhead field (SOH) consisting of three columns and three rows (3×3), and a line overhead (LOH) field consisting of three columns and six rows (3×6).

Figure 2:
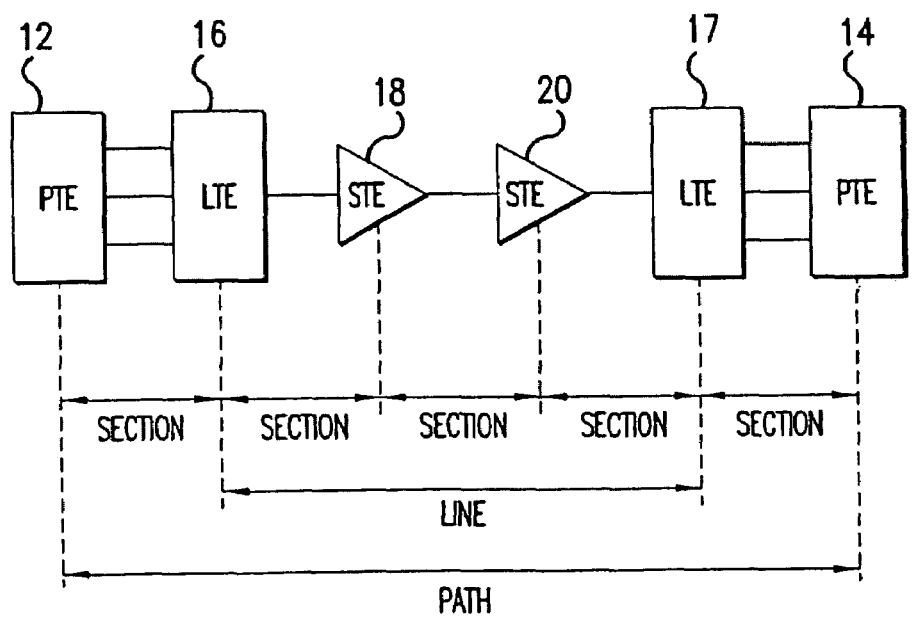
FIG. 2 illustrates path, line, and section definitions according to the SONET standard.

The terms section, line, and path are well known to those skilled in the art. FIG. 2, for example, illustrates one path in an optical network. A path extends between two path-terminating equipments (PTE) 12,14, e.g. terminals, which communicate on the network. A line in the path extends between two consecutive line-terminating equipments (LTE) 16, 17, which could be add-drop multiplexers. A section is a portion of a line between two section-terminating equipments (STE) 18,20, such as amplifiers 18,20, between an STE and an LTE, or between and LTE and a PTE.

Figure 3:
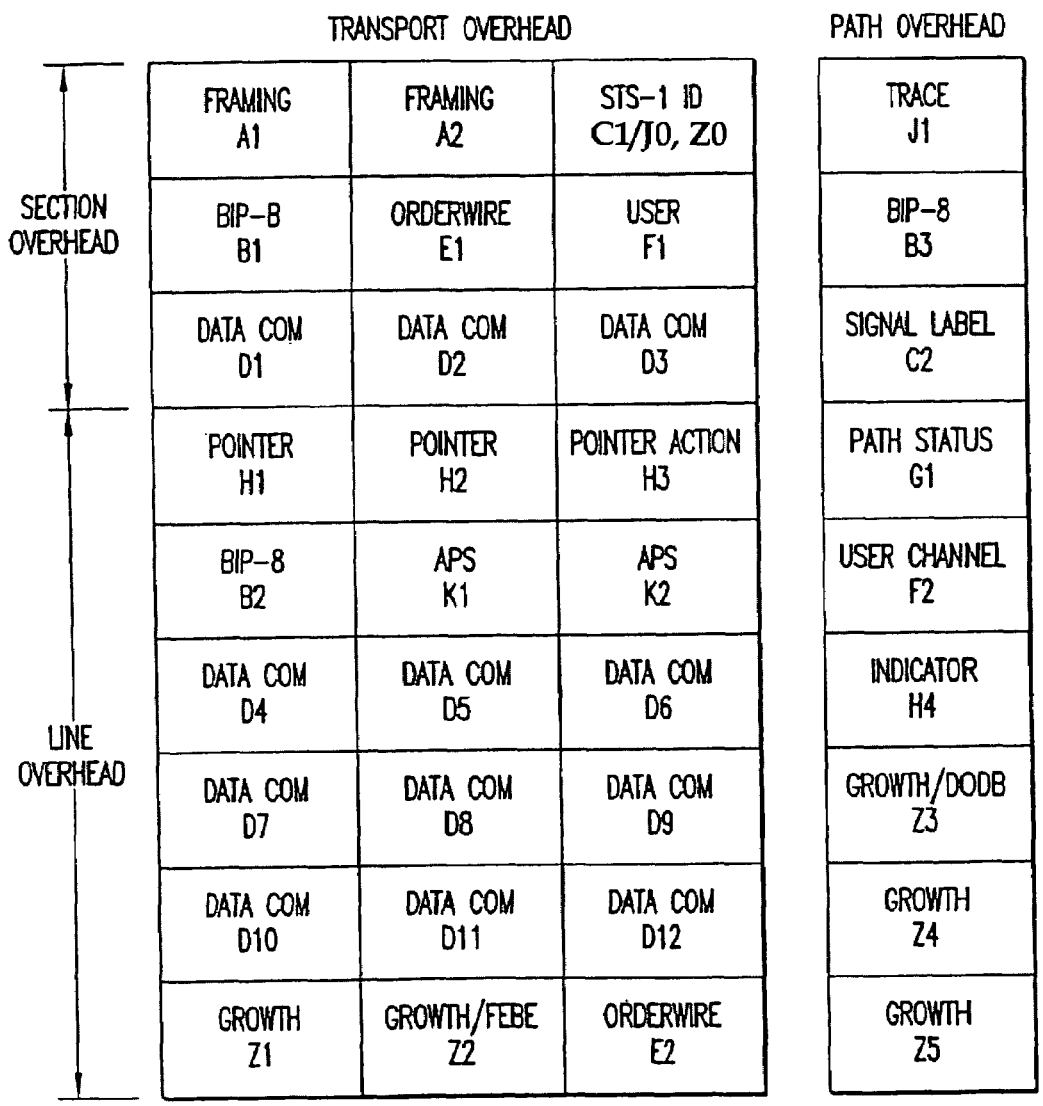
FIG. 3 is a diagram of byte overhead byte allocation according to the SONET standard.

Thus, the section overhead deals with the transport of multiplexed signals across a particular section. As illustrated more particularly in FIG. 3, the SOH includes framing bytes A1, A2, which consist of a unique bit sequence indicating the beginning of an STS-1 frame. Byte J0 is now used to physically identify the fibers and is present in the first STS-1 (STS-1 #1) of a STS-N signal, while byte Z0 represents an additional growth byte in all remaining STS-1s (STS-1 #2 to STS-1 #N). Section error monitoring byte B1 is used to determine if a transmission error has occurred over a section. Byte B1 is defined for STS-1 #1. A compounded bit interleaved parity (BIP-8) code is placed in the B1 byte of STS-1 before scrambling. Its value is an 8-bit code using even parity, calculated over all bits of the previous STS-N frame after scrambling.

Local orderwire (LOW) byte E1 provides a 64 Kb/s channel between section entities, and it is proposed as a voice channel for communications between regenerators, hubs and remote terminal locations. Byte F1 is the section user byte set aside for the network provider's purposes. It is passed from one section level entity to another and is terminated at all section level equipment. It can be read/written at each section terminating equipment, and is defined only for STS-1 #1. The section data communication channel (DCC) bytes D1, D2 and D3 provide a 192 Kb/s data channel between section entities, which is used for alarms, controls, monitoring, administration, and other communication needs. It is available for internally generated, externally generated and manufacturer specific messages. These bytes are defined only for STS-1 #1.

The line layer, or multiplex section, of SONET standard provides synchronization and multiplexing for the path layer. A line is a portion of the transmission facility between two consecutive line-terminating equipments (LTE), which could be add-drop multiplexers (ADM) or terminals (TM). An ADM multiplexes/demultiplexes signals into/from a higher rate signal. It accesses signals that need to be dropped or inserted at the ADM site, the rest of the traffic continuing straight through.

The LOH includes payload pointers H1, H2 used to specify the beginning of the synchronous payload envelope (SPE) within the frame. H1 and H2 are also used to accommodate frequency offsets between the received STS-N frame and the local system frame. These bytes are also used to indicate concatenation and STS-1 path alarm inhibit signal (AIS). Pointer H3 is defined for negative frequency justification, in which case it carries an extra SPE byte.

Byte B2 is for line error monitoring and is provided in all STS-1 signals in a STS-N. Its role is similar to that of byte B1. Automatic Protection Switching (APS) bytes K1 and K2 are used for signaling between line level entities for automatic protection switching, for indicating line Alarm Inhibit Signal (AIS) and Line Remote Defect Indicator (RDI). Line Data Communication Channel (DCC) bytes D4 to D12 provide a 576 Kb/s message channel between line entities for OAM&P information, available for internally generated, externally generated and manufacturer-specific messages.

Bytes S1/Z1 and Z2/M1 are defined depending on the position of the STS-1 in an STS-N signal. Thus, S1 is the synchronization message for STS-1 #1, and Z1 is a growth byte in STS-1 #2-48 of an STS-192. Byte M1 is used for a line layer far-end block error (FEBE) function in STS-1 #7 of a STS-N, while Z2 is the growth byte in STS-1 #1-6, and 8-48 of an STS-192. Finally, express orderwire (EOW) byte E2 provides a 64 Kb/s for use in interconnecting only line entities.

The path layer of SONET deals with the transport of services, such as DS1 or DS3, between path terminating equipments (PTE). The main function of the path layer is to map the services and path overhead (POH) into STS-1s, which is the format required by the line layer.

Trace byte J1 is used to identify that the correct connection was made between the two end points of the path; it is a user programmable byte that repetitively transmits a 64-byte fixed length string so that a receiving terminal in a path can verify its continued connection to the intended transmitter. The path BIP-8 code, the B3 byte, uses even parity calculated over all bits of the previous STS-SPE before scrambling.

Signal label byte C2 is used to indicate the type of payload mapping and number of constituent failed virtual tributaries (VTs). Byte G1 is used to transmit path status information from the destination to the origination equipment, and permits the status and performance of the complete duplex path to be monitored at either end, or at any point along the path. Byte F2 is allocated for network provider communication purposes between STS path terminating elements.

Multiframe indicator byte H4 is used for VT structured payloads. It indicates a variety of different superframes for use by certain sub-STS-1 payloads. Bytes Z3 and Z4 are allocated for future and as yet undefined purposes. Byte Z5 is used for two purposes: tandem connection maintenance error count and a 32 kb/s path data communications channel.

In general, a semi-transparent time division multiplexer (hereinafter "TDM") consistent with the present invention is provided for transmitting low rate tributaries from one location to another using a high rate aggregate connection, while preserving the TOH and payload for each tributary. This is accomplished by collecting one or more low speed tributaries and interleaving them into the single high-speed aggregate signal. Those skilled in the art will recognize that a TDM according to the invention also has utility as a demultiplexer that accepts a high-speed aggregate and de-interleaves it into one or more tributary interfaces in a manner that preserves the tributary TOH and payload. However, for ease of explanation herein, the present invention is illustrated and discussed primarily in connection with its forward operation, i.e. as a multiplexer. It is to be understood that the invention will work similarly for reverse direction traffic.

Advantageously, a TDM consistent with the present invention produces an aggregate signal containing compatible SONET/SDH framing, valid SONET/SDH pointers, valid SONET POH and valid SONET/SDH payload. The aggregate signal is not, however, compliant to SONET/SDH standards because the TOH for the aggregate signal is not generated or terminated in the standard SONET/SDH method. Instead, the aggregate TOH is substantially replaced by the TOH for each tributary. Thus, the aggregate could not be terminated by a standard SONET network element (NE), but could be terminated by another TDM consistent with the invention.

Consistent with the invention, therefore, substantially all of the TOH, with the exception of the A1, A2, and H1-H3 bytes, for each tributary is collected and interleaved into the TOH space of the aggregate signal. The standard SONET/SDH A1/A2 framing pattern is added to the aggregate. The tributary payload is added to the aggregate, and valid pointers to the payload are calculated and added to the aggregate.

Figures 4, 5:
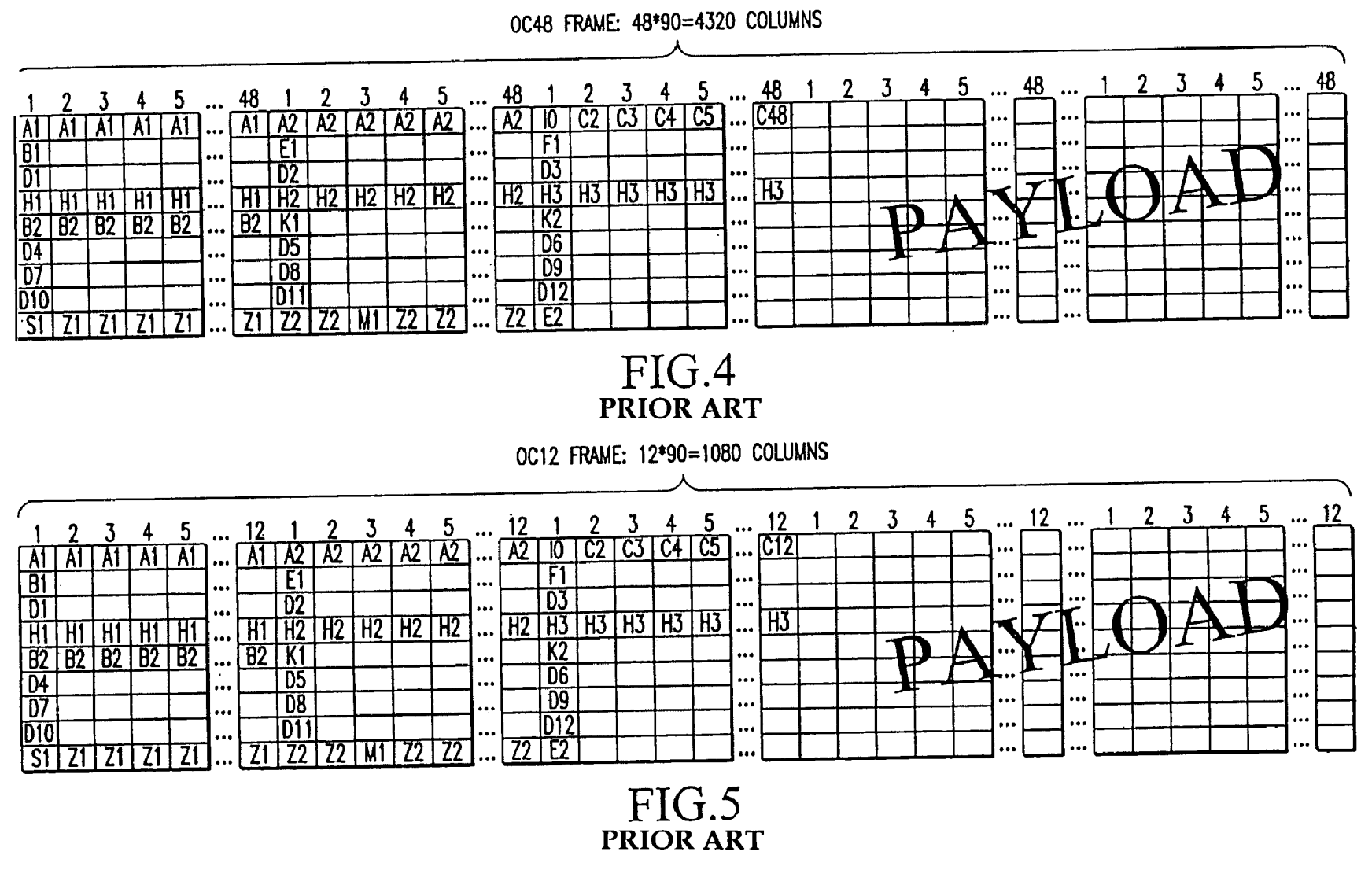
Figure 6:
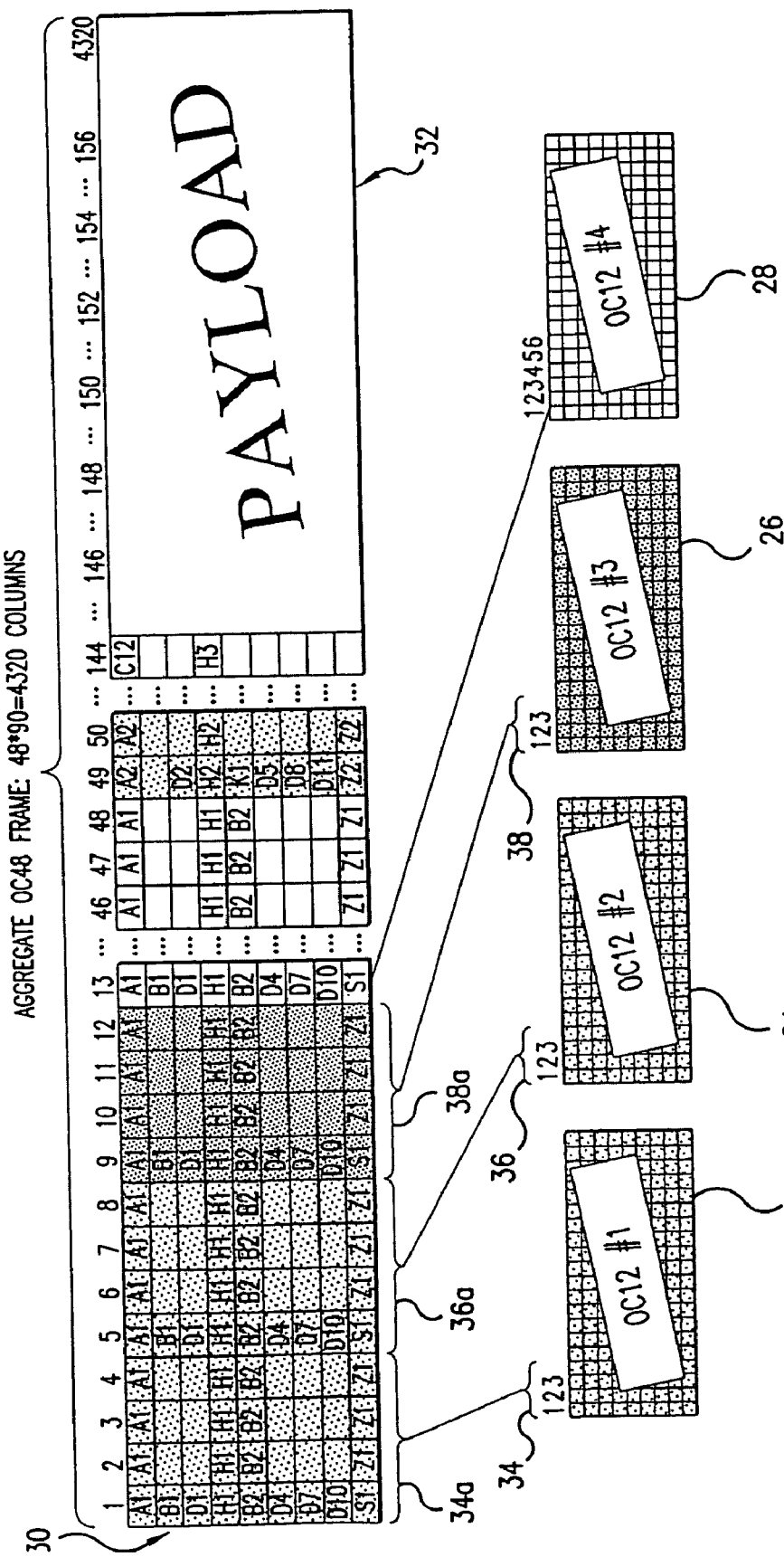
FIG. 6 illustrates interleaving of SONET OC-12 frames into an aggregate OC-48 frame consistent with the invention.

Turning to FIGS. 4-6, tributary interleaving consistent with the present invention will be described in connection with an exemplary embodiment wherein four OC-12 tributaries are combined into an aggregate signal at OC-48. It is to be understood, however, that the invention is not limited to multiplexing four OC-12 inputs into an OC-48 aggregate. Instead, a TDM consistent with the invention may be configured to multiplex any group of lower data rate signals into a higher data rate signal. For example, four OC-3 signals may be multiplexed into an OC-12 aggregate; four OC-48 signals may be multiplexed into an OC-192 aggregate, etc. The exemplary embodiments provided herein are thus provided only for ease of explanation, and not to be considered limiting.

FIG. 4 illustrates a standard SONET OC-48 frame including TOH and Payload, and FIG. 5 illustrates a standard SONET OC-12 frame including TOH and Payload. FIG. 6 illustrates interleaving of four OC-12 tributaries 22,24,26,28 into an OC-48 aggregate frame 30 consistent with the invention. Those skilled in the art will recognize that the standard method of interleaving SONET payload is to interleave the tributary payload into an aggregate payload 32 four bytes at a time. Consistent with the invention, payload is interleaved according to the standard method. In regard to the TOH, however, according to SONET standards, the aggregate TOH is created independently from the tributaries. In standard SONET, therefore, the TOH of the tributaries is unrecoverable from the aggregate.

A multiplexer consistent with the present invention, however, provides transparency of the tributary TOH, by interleaving substantially all of the TOH of each tributary into the aggregate TOH locations. Substantially all of the tributary TOH is recoverable from the aggregate by de-interleaving the aggregate at a receiving site. As illustrated in FIG. 6, in a TDM consistent with the invention, the TOH of each tributary is interleaved into the aggregate TOH locations, four bytes at a time.

Those skilled in the art will recognize that some of the standard SONET aggregate TOH is necessary for transporting the aggregate. Thus, it is not possible under SONET standards to directly copy all of the tributary TOH locations into the aggregate TOH in a manner that will allow intermediate network elements (NE) to pass the signal without detecting and corrupting the aggregate TOH. Consistent with the present invention, therefore, the tributary TOH bytes are treated in accordance with Table 1.

TABLE 1

| Trib. Byte | Description | Aggregate |
| --- | --- | --- |
| A1, A2 | Framing | Terminated and regenerated at the TDM |
| J0/Cx | Section Trace/STS-ID | Default copied from tributaries so that AggrJ0[1-4] = Trib [1-4]J0. Provisioned to be terminated and originated by the TDM. |
| B1 | Section Parity | Terminated and originated at the TDM. Error forwarding optional |
| E1 | Section Orderwire | Default: Copied from tributaries so that AggrE1 [1-4] = Trib [1-4] E1. |
| F1 | Section User Byte | Copied from tributaries so that AggrF [1-4 = Trib [1-4] F1 |
| D1-D3 | Section DCC | Copied from tributaries so that AggrD123 [1-4] = Trib [1-4] D123 |
| H1-H3 | Pointers and Action Byte | Terminated and originated at the TDM |
| B2 | Line Parity | Terminated and originated at the TDM Error forwarding optional |
| K1, K2 | APS Bytes | Copied from the tributaries so that AggrK1K2 [1-4] = Trib [1-4] K1K2 |
| D4-D12 | Line DCC | Copied from tributaries so that AggrD4/12[1-4] = Trib [1-4] D4/12 |
| S1/Z1 | Synchronization Message Byte and Expansion | Terminated and originated at the TDM. Sync message based on Sync Reference |
| Z2/M1 | Expansion and REI-L bytes | Copied from the tributaries so that AggrZ2M1 [1-4] = Trib [1-4] Z2M1 |
| E2 | Line Orderwire | Default: Copied from tributaries so that AggrE2 [1-2] = Trib [1-4] E2 |
| Unused TOH | Not specified | Copied from Tributaries so that AggrUTOH [1-4] = Trib [1-4] UTOH |

Thus, with the exception of A1, A2, B1, B2, H1-H3, and S1, all tributary TOH bytes are copied directly into the aggregate TOH. For example, with the above-mentioned exceptions, the first four TOH columns 34 of the first OC-12 signal 22 are copied directly into the first four columns 34a of the aggregate 30. The first four TOH columns 36 of the second OC-12 signal 24 are copied directly into the next four columns 36a (columns 5-8) of the aggregate 30. The first four TOH columns 38 of the third OC-12 signal 26 are copied directly into the next four columns 38a (columns 9-12) of the aggregate 30. The first four TOH columns (only one column is shown) of the fourth OC-12 signal 28 are copied directly into the next four columns (columns 13-16) of the aggregate 30. The interleaving of the tributary TOH continues in this manner until substantially all TOH is interleaved into the aggregate. As discussed above, payload from each tributary is interleaved, four bytes at a time, into the aggregate payload.

In some cases, however, additional portions of the tributary TOH will be interleaved into valid aggregate TOH locations that are needed to transport the aggregate. Those skilled in the art will recognize that some of the standard SONET aggregate TOH is necessary for transporting the aggregate. Thus, it is not possible under SONET standards to directly copy all of the tributary TOH locations into the aggregate TOH in a manner that will allow intermediate network elements (NE) to pass the signal without detecting and corrupting the aggregate TOH.

Consistent with the present invention, therefore, tributary TOH locations, e.g., the J0, K1, K2 bytes, and B1 errors, that would be interleaved into valid and necessary standard SONET aggregate TOH locations may be re-mapped or "tunneled" into locations of the aggregate TOH that are undefined by SONET. This allows the tunneled TOH locations to pass through an intermediate NE without detection, and, if the intermediate NE passes these unused locations as received, without corruption. A downstream device, such as a TDM mux consistent with the invention, would retrieve these locations from the assigned undefined aggregate TOH into which they have been tunneled, and place them in the correct tributary TOH locations when de-interleaving and transmitting the tributary signal. Tunneling of these tributary TOH locations thus maintains transparency of these tributary TOH locations.

Figure 7A:
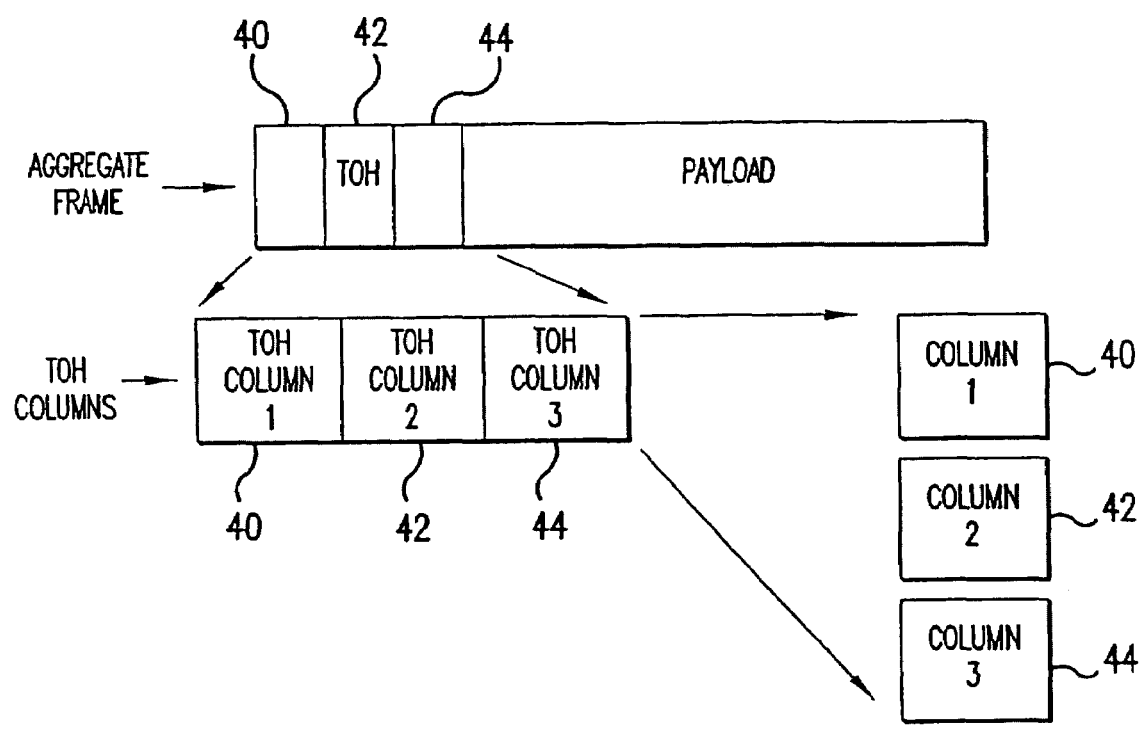
FIG. 7A is a key to the orientation of the frames illustrated in FIGS. 7B-7D, 8, and 9.
Figure 7D:
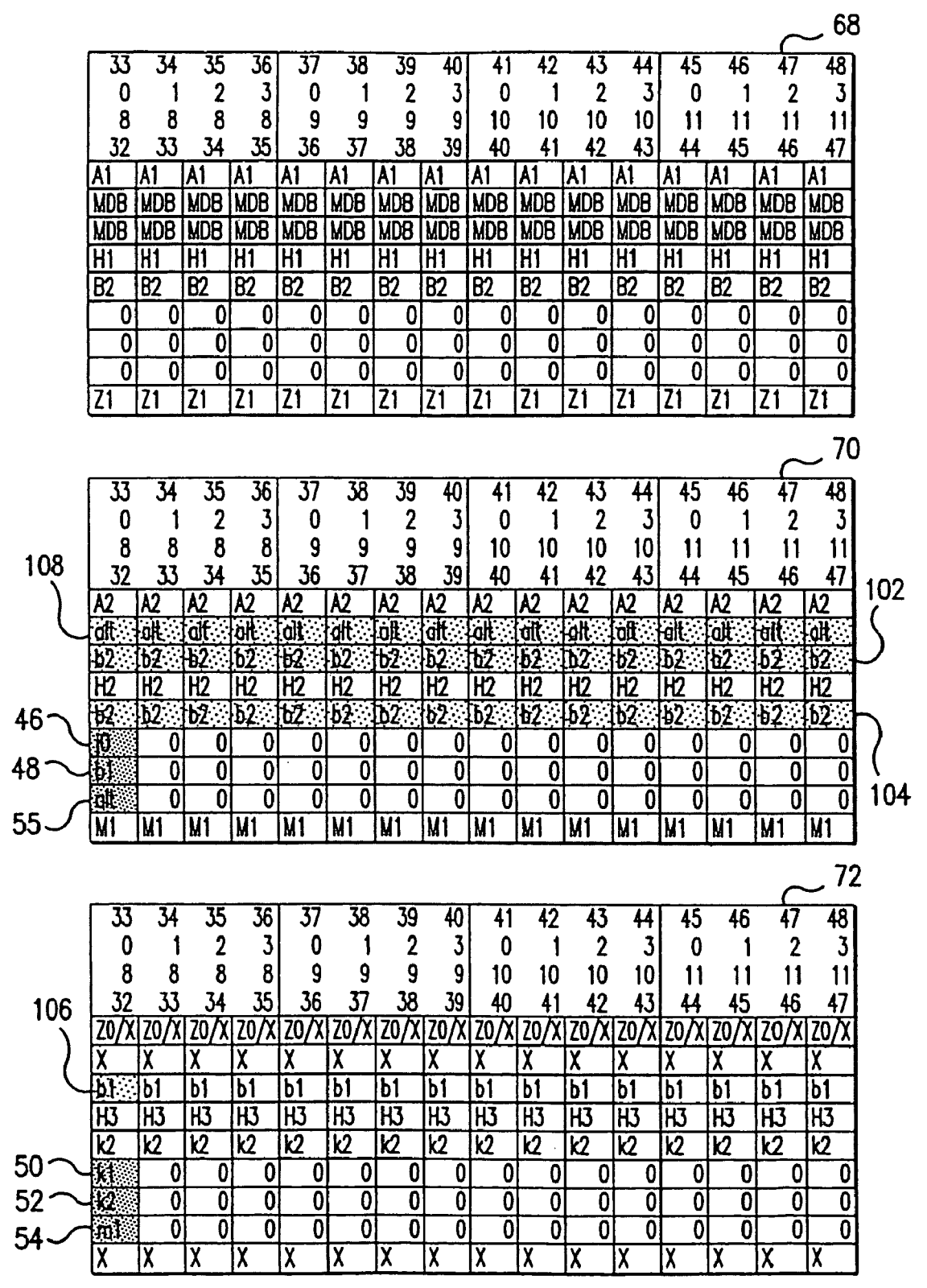

Turning to now to FIGS. 7-9, there is shown exemplary TOH aggregate frames consistent with the invention. For ease of display and explanation, in FIGS. 7B-D, 8 and 9 the TOH of each aggregate frame has been separated into three columns 40,42,44 displayed in sequentially from the top of the page to the bottom of the page, as illustrated generally in FIG. 7A. In FIGS. 7B-7D, there is shown an exemplary aggregate OC-48 frame 41 generated by multiplexing sixteen OC-3 tributaries into four OC-12 tributaries in a manner consistent with the invention. The illustrated OC-48 aggregate frame includes 48 TOH locations in each of the columns defined in FIG. 7A. FIG. 7B illustrates, from the top to bottom, the first 16 locations 56, 58, 60 of the first 40, second 42, and third 44 columns, respectively, of aggregate TOH. FIG. 7C illustrates the next sixteen locations 62, 64, 66 of each of the columns, and FIG. 7D illustrates the last sixteen locations 68, 70, 72 of each of the columns.

The undefined TOH locations in the aggregate where tunneled tributary TOH locations have been placed in the exemplary OC-48 aggregate are illustrated in FIG. 7D. As shown, tributary J0, B1, K1, K2, and M1 locations that would have conflicted with necessary aggregate TOH locations if they had been directly copied into the aggregate, have been tunneled to locations 46,48,50,52,54 respectively. The location 55 identified as "alt" represents an alternate location where any of the tunneled tributary TOH locations may be placed.

FIGS. 8 and 9 represent exemplary aggregate OC-12 and OC-3 frames, respectively, consistent with the invention. In the exemplary OC-12 aggregate 74 illustrated in FIG. 8, tributary J0, B1, K1, K2, and M1 locations that would have conflicted necessary aggregate TOH locations if they had been directly copied into the aggregate, have been tunneled to locations 76,78,80,82,84 respectively. Location 86 identified as "alt" indicates an alternate tunneling location. In the exemplary OC-3 aggregate 88 illustrated in FIG. 9, tributary J0, K1 and M1 have been tunneled to locations 90,92,94 respectively. Location 96 identified as "alt" indicates an alternate tunneling location.

In the exemplary embodiments illustrated in FIG. 7B-D, 8, and 9 therefore, portions of the tributary TOH are tunneled into unused/undefined locations in the aggregate TOH to avoid detection and corruption of the aggregate. It is to be understood, however, that the particular locations into which tributary TOH is tunneled are identified only for purposes of explanation, not of limitation. Consistent with the invention, the tributary TOH can be tunneled into any unused location in the aggregate overhead. The particular undefined locations in the aggregate TOH chosen for tunneling may be programmed directly into the TDM software defining the operation of the TDM.

Alternatively, the TDM may be appropriately programmed to automatically locate unused overhead for transferring tunneled tributary TOH. In one exemplary embodiment, the TDM could identify a candidate undefined TOH location in an aggregate frame. If the value at the identified candidate location did not change for a predefined number (N) frames, e.g. 20 frames, then the location could be identified as available for tunneling.

With continued reference to FIGS. 7-9, the tributary TOH BIP (Bit Interleaved Parity), B1, B2 may also be tunneled to an undefined location in the aggregate frame so that intermediate NEs will not detect or corrupt the information. In an OC-48 aggregate 41, as illustrated, for example, FIGS. 7B-7D, tributary B2 locations (identified in lower case as "b2") may be tunneled to undefined aggregate TOH in row 100 shown in FIG. 7C. Additional tributary B2 locations may be tunneled to undefined aggregate TOH in rows 102 and 104 in FIG. 7D. A tributary B1 location may be tunneled to location 106, and alternate ("alt") locations may be identified in row 108.

In the exemplary OC-12 frame 72 illustrated in FIG. 8, tributary B2 locations (identified by lower case as "b2") may be tunneled to locations in rows 110 and 112, as shown, and alternate "alt" locations can be identified in row 114. A tributary B1 location may be tunneled to location 116. In the exemplary OC-3 frame 88 illustrated in FIG. 9, tributary B2 locations (identified by lower case as "b2") may be tunneled to locations 118,120,122, as shown. An alternate "alt" location can be identified at location 96, and a tributary B1 location may be tunneled to location 124. Again the locations of tunneled tributary B1 and B2 bytes in the aggregate frames illustrated in FIGS. 7B-7D, 8 and 9 is provided by way of illustration, not of limitation. Other unused locations may be used for tunneling these bytes.

Advantageously, tunneling the tributary TOH BIP error information into unused/undefined locations in the aggregate TOH allows it to pass through an intermediate NE without detection, and if the intermediate NE passes these unused locations as received, without corruption. A downstream device, such as a TDM consistent with the invention, would receive the tributary TOH BIP information from the assigned unused aggregate TOH and use it to corrupt the transmitted tributary signals.

Figure 10:
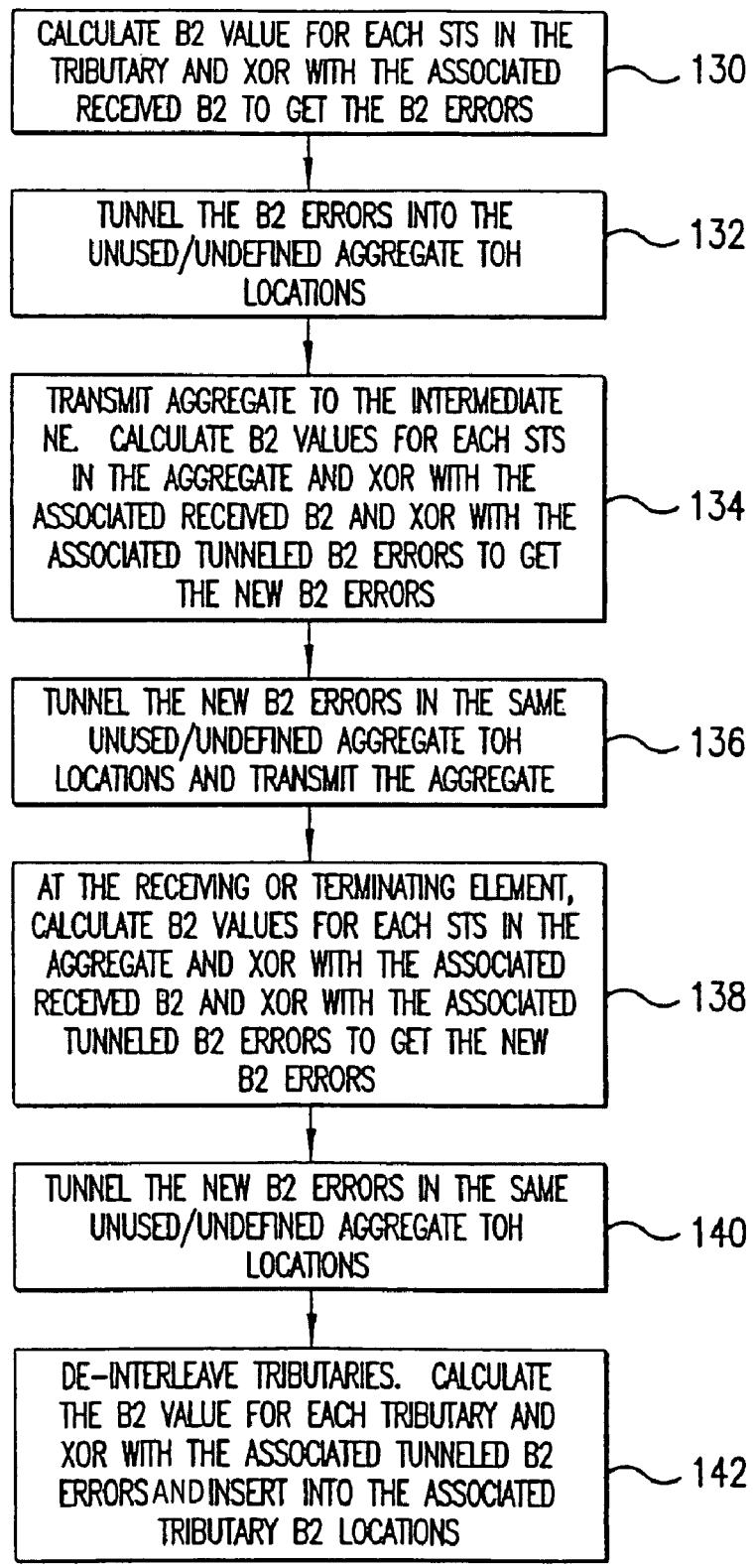
FIG. 10 is a block diagram of an exemplary error tunneling method consistent with the present invention.

More particularly, and consistent with the present invention, sending errors occurring at the input and in the network to the client may be accomplished in two ways, tunneling and forwarding. The steps associated with an exemplary method of tunneling errors are illustrated in FIG. 10. As shown, for each tributary input the B2 value for each STS in the tributary is calculated and XOR'd 130 with the associated received B2 to get the B2 errors. Each B2 is calculated over the entire associated STS according to SONET standards. The resulting B2 errors are tunneled 132 into the unused/undefined aggregate TOH locations, as illustrated for example in FIGS. 7B-7D, 8 and 9.

The aggregate is then transmitted to one or more intermediate NEs. At each intermediate NE, B2 values are calculated for each STS in the aggregate and XOR'd 134 with the associated received B2. The result is XOR'd 134 with associated tunneled B2 errors to get new B2 errors. The new B2 errors are tunneled back 136 into the same unused/undefined aggregate TOH locations, and the aggregate is transmitted. At a terminating or receiving element, such as a TDM consistent with the invention, B2 values for each STS are again calculated and XOR'd 138 with the associated received B2s. The result is XOR'd 138 with associated tunneled B2 errors to get new B2 errors. The new B2 errors are tunneled back 140 into the same unused/undefined aggregate TOH locations, and the aggregate is transmitted. At a terminating element, the tributaries are then de-interleaved from the aggregate. The B2 associated with each STS in the tributary is calculated and XOR'd 142 with the associated tunneled B2 errors to get new B2 errors. The new B2 errors are inserted into the associated tributary B2 locations 142. The resulting tributary B2s thus identify all errors entering the network and all errors occurring within the network.

Figure 11:
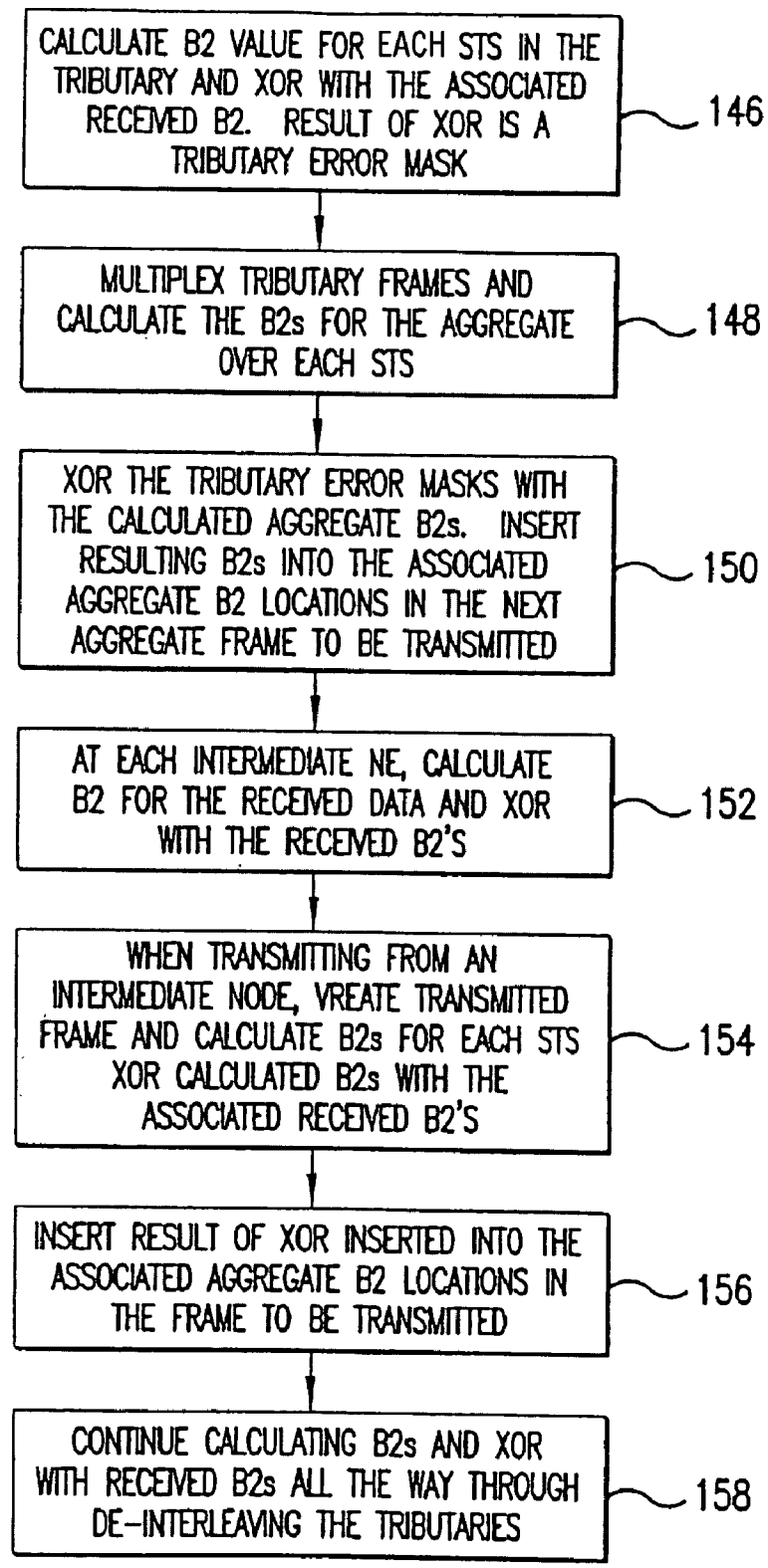
FIG. 11 is a block diagram of an exemplary error forwarding method consistent with the present invention.

Error forwarding is an alternative method of sending errors along a network consistent with the invention. Error forwarding includes calculating a received B2 and comparing it against a received B2 in a manner similar to that described above relative to error tunneling. A main difference in error forwarding is that the masks are XOR'd into the aggregate B2 locations instead of in tunneled locations. As illustrated for example in FIG. 11, in an error forwarding method the B2 value for each STS in each tributary is calculated and XOR'd 146 with the associated received B2. Each B2 is calculated over the entire associated STS according to SONET standards. The result of each XOR is a tributary error mask. The tributary frames are then multiplexed by a TDM consistent with the invention, and the B2s for the aggregate are calculated 148 over each of the aggregate STSs. The tributary error masks are then XOR'd 150 with the calculated aggregate B2s. This results in B2s representing the aggregate B2s with the respective tributary errors added therein. The resulting B2s are inserted 150 into the associated aggregate B2 locations in the next aggregate frame to be transmitted.

At an intermediate NE, each B2 is calculated for the received data and XOR'd 152 with the received B2's. The result of the XOR gives a new B2 mask identifying all errors between the transmitting element and the receiving NE, as well as transmitted errors. When transmitting from an intermediate node, the transmitted frame is created and B2s are calculated for each STS and XOR'd 154 with the associated received B2 masks. The XOR operation produces new B2 that are inserted 156 into the associated aggregate B2 locations in the frame to be transmitted. This process continues 158 all the way through to the receiving tributaries, which receive B2s identifying all errors occurring within the network and all errors supplied to the network.

Although the above description of tunneling and forwarding has been described in connection with B2 bytes, it is to be understood that both methods have equal applicability to B1 and B3 error bytes. For example, in each of the above-referenced error forwarding methods, the error information may be detected at an upstream device may be inserted in the downstream aggregate at an associated location. For example, B1 BIP errors detected at an upstream device such as a TDM Mux could be inserted in the downstream signal in the B1 byte location. A downstream device such as a TDM mux would then view the received B1 location as error forwarding information instead of B1 BIP information. Also, B2 BIP errors detected at an upstream device such as a TDM Mux could be inserted in the downstream signal in the B2 bye location. A downstream device such as a TDM mux would then view the received B2 location as error forwarding information instead of B1 BIP information. If the upstream device is a TDM, then the B2 errors received for each tributary could be placed in the B2 locations associated with the tributary by interleaving the tributary B2 locations. The downstream device would de-interleave the B2 locations and associate B2 BIP errors only with the associated tributaries.

Figure 12:
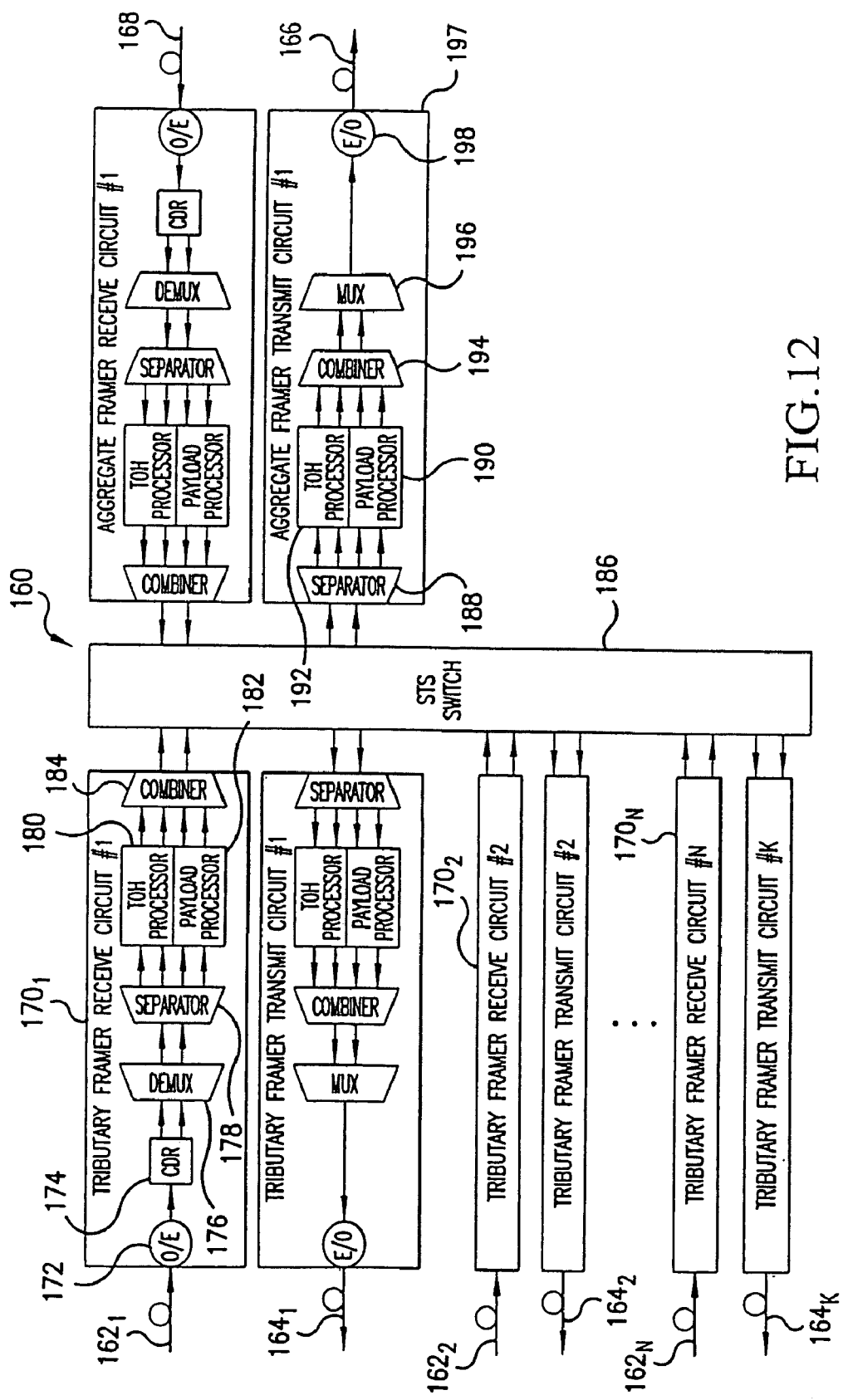
FIG. 12 is a block diagram of an exemplary semi-transparent time division multiplexer/demultiplexer consistent with the invention illustrating blocks for both forward and reverse direction traffic.

Turning now to FIG. 12, there is shown a general block diagram of an exemplary TDM multiplexer/demultiplexer 160 consistent with the invention. As shown, the exemplary TDM includes a plurality of (N) tributary input ports $162_1$, $162_2 \ldots 162_N$ and a plurality of (K) tributary output ports $164_1$, $164_2 \ldots 164_N$. A single output port 166 for providing a high data rate aggregate output including the low data rate tributary input signals consistent with the invention is provided, along with and input port 168 for receiving a high data rate aggregate input to be demultiplexed. For ease of explanation, the forward operation, i.e. multiplexing mode, of the illustrated TDM mux will be discussed herein. It will be recognized that the TDM mux will work in reverse direction, i.e., as a demultiplexer for receiving a high data rate aggregate and demultiplexing the aggregate into respective tributaries.

Each input port of the TDM is coupled to an associated Tributary Framer Receive Circuit $170_1$, $170_2 \ldots 170_N$ for creating an appropriately timed frame from the tributary. Each Tributary Framer Receive circuit includes conventional optical to electrical converter 172 (O/E) for converting the received tributary optical signal and converting the same into an electrical signal. The output of the O/E is coupled a standard clock and data recovery circuit 174 (CDR) which recovers the clock and data from the received serial input. Those skilled in the art will recognize that this function may be accomplished in a variety of ways, e.g. using a phase locked loop, saw filter, etc.

The clock and data are provided on separate outputs of the CDR and are coupled to a standard demultiplexer 176. The demultiplexer converts the received serial signal into a parallel signal. The output of the demultiplexer is the clock recovered from the tributary input and a parallel data signal. The clock and parallel data signal are coupled for transmission to a separator 178 that divides the received data stream into separate TOH and Payload signals. The TOH and Payload signals are coupled, along with the clock signal, to respective TOH 180 and Payload processor 182 circuits. The Payload processor 182 conducts standard SONET payload retiming to obtain a synchronized clock for all tributary frames to be transmitted. As will be recognized by those skilled in the art, standard payload re-timing is generally accomplished by buffering payload bytes and interpreting/generating pointer bytes H1-H3 using standard pointer adjustment algorithms.

Figure 13:
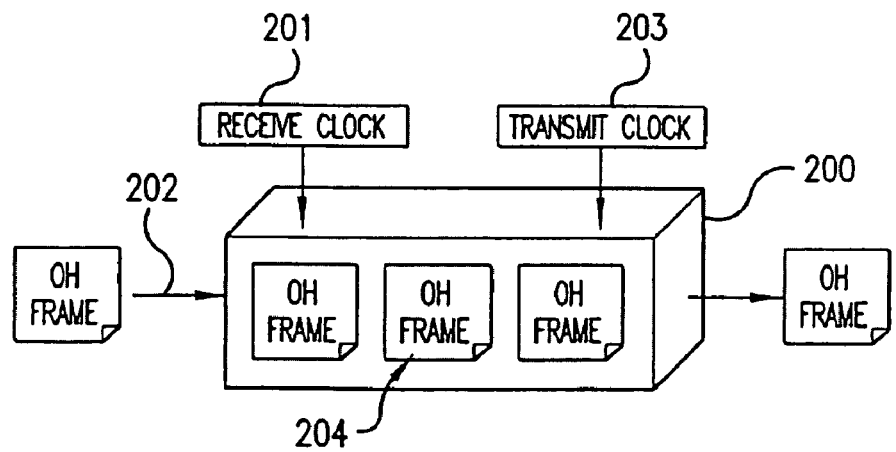
FIG. 13 illustrates an exemplary TOH re-timing method consistent with the invention wherein an overhead frame is deleted from a frame buffer when the buffer receive clock is faster than the buffer transmit clock.
Figure 14:
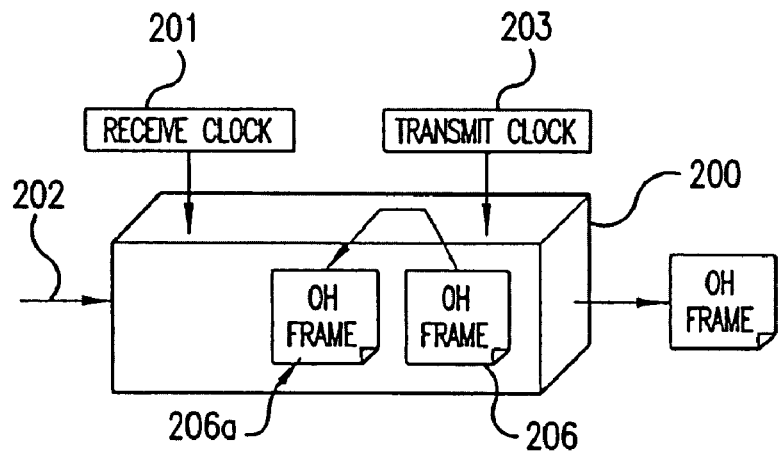
FIG. 14 illustrates an exemplary TOH re-timing method consistent with the invention wherein an overhead frame is repeated in a frame buffer when the buffer receive clock is slower than the buffer transmit clock.

Consistent with the present invention, overhead re-timing may be accomplished by the TOH processor 180 using controlled-slips. With reference to FIGS. 13 and 14, for example, the TOH processor may include an elastic TOH frame buffer 200. The input 202 to the buffer is the received TOH at the received TOH timing rate. The output of the buffer is the TOH re-timed to the downstream or transmitting timing rate. In the case where the rate of the receive clock 201 exceeds the rate of the transmit clock 203, when the buffer 200 almost full, an entire frame 204 of TOH is deleted from the buffer, as illustrated, for example, in FIG. 13. However, when the rate of the receive clock 201 is less than the rate of the transmit clock 203, as illustrated in FIG. 14, the last TOH frame 206 is copied as a new frame 206a in the buffer.

When a frame of TOH is deleted from the buffer 200 or when a frame is repeated in a buffer, the TOH bytes are affected according to Table 2.

TABLE 2

| Byte | Description | Effects of Slips | Optional Processing |
|---|---|---|---|
| A1, A2 | Framing | N/A Framing is regenerated | |
| J0/Cx | Section Trace/STS-ID | Will lose a byte | |
| B1 | Section Parity | N/A parity is recalculated | |
| E1 | Section Orderwire | Will lose a byte, which may cause an audible click in the phone. | Orderwire |
| F1 | Section User Byte | Will lose a byte | |
| D1-D3 | Section DDC | Will corrupt the current packet | Allow slips only during space between packets |
| H1-H3 | Pointers and Action Byte | N/A Pointers are recalculated | |
| B2 | Line Parity | N/A Parity is recalculated | |
| K1, K2 | APS Bytes | Will lose a byte, but the APS protocol allows for several lost bytes. | |
| D4-D12 | Line DCC | Will corrupt the current packet | Allows slips only during space between packets |
| S1/Z1 | Synchronization Message Byte and Expansion | Will lose a byte, but the Sync protocol allows for several loss bytes. | |
| Z2/M1 | Expansion and REI-L bytes | Will lose a byte | |
| E2 | Line Orderwire | Will lose a byte, which may cause an audible click in the Orderwire phone | |

Figure 15:
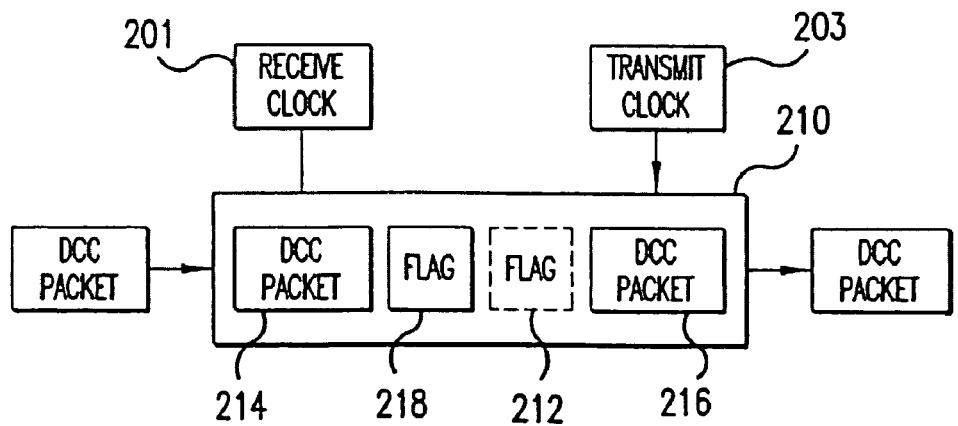
FIG. 15 illustrates an exemplary DCC re-timing method consistent with the invention.

As shown in Table 1, DCC packet corruption can be prevented by re-timing the DCC independently of the rest of the TOH. Those skilled in the art will recognize that DCC traffic uses an HDLC layer of protocol processing. DCC packets are therefore passed with flag characters filling the space between packets. DCC re-timing may therefore be accomplished, as illustrated for example in FIG. 15, by writing DCC packets to a DCC buffer 210. When the receive clock 201 is slower than the transmitting clock 203, spare flag bytes, e.g. byte 212 can be added between the packets adjacent packets 214, 216. When the receive clock 201 is faster than the transmitting clock 203, DCC re-timing may be accomplished by removing spare flag byte, e.g. flag byte 218, between the packets. This DCC re-timing algorithm can re-time channels that are up to and exceeding 99% full, depending on the clock source frequency differences.

Those skilled in the art will recognize other methods of retiming the TOH in a TDM consistent with the invention. For example, the TOH may be retimed using a ping-pong buffer. In this approach, two complete memory banks or buffers are used to hold two different frames of received TOH data. A receive circuit writes TOH into only one bank at a time, and a transmit circuit reads TOH out of one bank at a time. The read bank is switched each time an entire TOH frame is read. A decision circuit is provided to determine which bank is write bank. If the current write bank is not the current read bank, the current write bank is full, and the read bank has been read by at least a specified number of locations, then the write bank is switched to other bank. Otherwise, the current write bank is used. If the current write bank is the same as the current read bank, the current write bank is full, and the read bank has not been read by a specified number of locations, the current write bank is re-used.

With reference again to FIG. 12, the output of the Payload processor 182 includes the new synchronized clock and retimed Payload. The output of the TOH processor 180 includes a new synchronized clock and retimed TOH. When tunneling of overhead bytes is implemented, according to the above-described method, the TOH processor 180 also includes circuits for tunneling or re-mapping the tunneled TOH bytes to undefined/unused locations. Those skilled in the art will recognize that the tunneling circuits can be implemented in a variety of ways.

These outputs of the TOH and Payload processors are coupled to a combiner 184 that combines the received TOH and Payload into a frame to be transmitted. The output of the combiner is coupled, along with outputs of combiners in other Tributary Framer Receive Circuits, to an STS switch 186 that interleaves the STSs (TOH and Payload) using the SONET/SDH standard algorithm, in the manner described above. The output of the STS switch includes interleaved STSs from all tributaries and the synchronized clock, and is coupled to an Aggregate Framer Transmit Circuit 197.

The Aggregate framer 197 functions in a manner similar to each tributary framer, and re-times the aggregate signal to a transmit clock. Thus the aggregate framer includes a separator 188 for dividing the received aggregate stream into TOH and Payload signals. The TOH and Payload outputs of the separator are coupled, along with the synchronized clock, to respective TOH 192 and Payload 190 processors. The TOH 192 and Payload 190 processors function in a manner similar to the TOH and Payload processors of the tributary framer circuits to re-time the TOH and Payload to a transmit clock. The transmit clock is at a frequency equal to a multiple of the clock frequency receive from the tributaries. For example, in the case where four OC-12 tributaries are combined into an aggregate OC-48, the transmit clock is four times the tributary clock.

The re-timed TOH and Payload are coupled to a combiner 194, which combines the TOH and Payload into a parallel aggregate signal. The aggregate output of the combiner 194 is coupled to a multiplexer 196, which multiplexes the received parallel signal into a serial aggregate signal. The output of the serial aggregate signal is coupled to a conventional electrical to optical converter 198 (E/O), which converts the received electrical signal into an optical signal for transmission over a network.

There is thus provided an a semi-transparent time division multiplexer/demultiplexer which transmits low rate tributaries from one location to another using a high rate aggregate connection, while preserving substantially all of the TOH and payload for each tributary signal. Transparency of the tributary TOH is accomplished by interleaving both the TOH and the Payload of each tributary into the high rate aggregate signal. Some TOH bytes may be tunneled or re-mapped into unused/undefined TOH locations in the aggregate signal to allow transparency of the TOH without corrupting the aggregate. Errors may be handled by tunneling BIP bytes into unused/undefined aggregate locations and updating the tunneled Bytes with error masks calculated at each network elements. Alternatively errors may be forwarded by using an error mask generated from the tributary BIP locations and inserting the mask into the associated aggregate BIP locations. The mask in the aggregate BIP is updated with error masks calculated at each network elements. Re-timing of TOH to a synchronized clock in the tributary framer circuits can be accomplished using controlled slips of overhead frames, whereby an entire frame is dropped or added depending on the relationship of the received clock and the synchronized clock. DCC bytes may be re-timed by adding or deleting flag bytes occurring between respective DCC packets. Re-timing of the aggregate TOH to a transmit clock may be accomplished in a similar manner.

While the foregoing invention has been described in terms of the embodiments discussed above, numerous variations are possible. Accordingly, modifications and changes such as those suggested above, but not limited thereto, are considered to be within the scope of the following claims.

The invention claimed is:

1. A multiplexer providing transparency of transport overhead (TOH) from tributary input signals, comprising:
a plurality of input ports, each of said input ports receiving a respective one of a plurality of tributary input signals, each of the tributary input signals including a transport overhead (TOH) signal and a payload signal; and
a plurality of tributary framer receive circuits, each of said tributary framer receive circuits being coupled to respective one of said input ports,
at least one of said plurality of tributary framer receive circuits mapping at least one byte of at least one of said TOH signals into a TOH location of an aggregate signal aggregating the plurality of tributary input signals, wherein the at least one mapped byte comprises at least one of a section BIP byte and a line BIP byte from the at least one TOH signal.

2. The multiplexer according to claim 1, wherein the at least one mapped byte comprise at least one J0, K1, K2 or M1 byte from the at least one TOH signal.

3. The multiplexer according to claim 1, wherein the at least one mapped byte comprises a BIP byte from the at least one TOH signal.

4. The multiplexer according to claim 1, wherein the at least one mapped byte comprises a B2 byte from the at least one TOH signal.

5. The multiplexer according to claim 1, wherein the at least one mapped byte comprises all B2 bytes from each of the TOH signals.

6. The multiplexer according to claim 1, wherein the tributary input signals are formatted according to the SONET standard.

7. The multiplexer according to claim 1, further comprising:
an STS switch operatively coupled to said plurality of tributary framer receive circuits, said STS switch combining each of the payload signals and a portion of each of the TOH signals into the aggregate signal, the at least one mapped byte being combined into another TOH location of the aggregate signal.

8. The multiplexer according to claim 7, wherein at least some of the plurality of tributary input signals have a first data rate, the multiplexer further comprising:
an aggregate framer transmit circuit operatively coupled to said STS switch, said aggregate framer transmit circuit transmitting said aggregate signal at a second data rate higher than the first data rate.

9. A method of providing transparency of transport overhead (TOH) from tributary input signals, comprising:
receiving the tributary input signals, each of the tributary input signals including a transport overhead (TOH) and a payload signal;
mapping at least one tributary TOH byte of at least one tributary input signal into a TOH location of an aggregate signal, wherein the at least one mapped tributary TOH byte comprises at least one of a section BIP byte and a line BIP byte of the at least one tributary input signal; and aggregating the tributary payloads into aggregate payload locations of the aggregate signal.

10. The method according to claim 9, said mapping step mapping at least one J0, K1, K2 or M1 byte from the at least one tributary input signal into another TOH location of the aggregate signal.

11. The method according to claim 9, said mapping step mapping at least one BIP byte from the at least one tributary input signal into another TOH location of the aggregate signal.

12. The method according to claim 9, said mapping step mapping at least one B2 byte from the at least one tributary input signal into another TOH location of the aggregate signal.

13. The method according to claim 9, said mapping step mapping all B2 bytes from each of the tributary input signals into other TOH locations of the aggregate signal.

14. The method according to claim 9, said mapping step interleaving substantially all of the tributary TOH into other TOH locations of the aggregate signal with the exceptions of A1, A2, H1, H2 and H3 bytes.

15. The method according to claim 14, further comprising: transmitting the aggregate signal across a communications network.

16. The method according to claim 15, wherein at a receiver node connected to the communications network the method further comprises:

deinterleaving the aggregate signal into a plurality of tributary output signals each of which is respectively associated with a corresponding one of the tributary input signals; and remapping the tributary TOH bytes from the aggregate signal to respective ones of a TOH of the tributary output signals associated with the corresponding tributary input signals.

17. The method according to clam 9, further comprising: transmitting the aggregate signal across a communications network.

18. The method according to claim 17, wherein at a receiver node connected to the communications network the method further comprises:

deinterleaving the aggregate signal into a plurality of tributary output signals each of which is respectively associated with a corresponding one of the tributary input signals; and remapping the at least one tributary TOH byte from the aggregate signal to a TOH of the tributary output signal associated with the corresponding tributary input signal.

19. The method according to claim 9, said receiving step receiving the tributary input signals that are formatted according to the SONET standard.

20. A method of providing transparency of transport overhead (TOH) from tributary input signals in a communication network wherein the tributary input signals are multiplexed by a transmitting element into an aggregate signal for transmission on the communication network to a receiving element for demultiplexing the aggregate signal into a plurality of tributary output signals, each of the tributary output signals being associated with a respective one of said tributary input signals, said method comprising:

receiving the tributary input signals, each of the tributary input signals including a tributary transport overhead (TOH) and a payload;

mapping at least some of the tributary TOH bytes into TOH locations of the aggregate signal, wherein the at least some mapped tributary TOH bytes comprise one or more of a section BIP byte and a line BIP byte;

aggregating the tributary payloads into an aggregate payload locations of the aggregate signal;

transmitting the aggregate signal across a communications network;

deinterleaving the aggregate signal into the plurality of tributary output signals each of which is respectively associated with a corresponding one of the tributary input signals; and remapping the tributary TOH bytes from the aggregate frame to respective ones of a TOH of the tributary output signals associated with the corresponding tributary input signals.

* * * * *